March 22, 1955
R. I. FREDRICKSON
2,704,470
METHOD FOR FLUSH RIVETING
Filed April 11, 1951
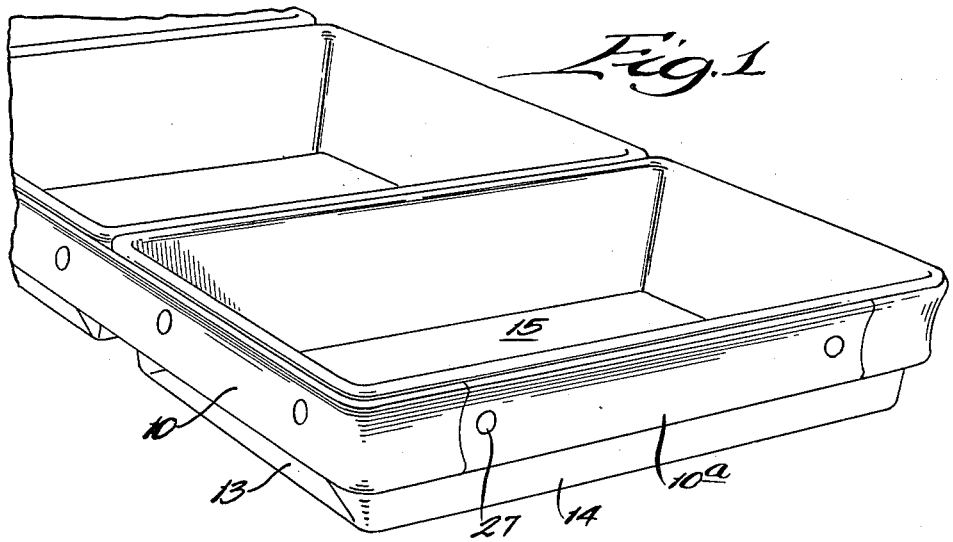
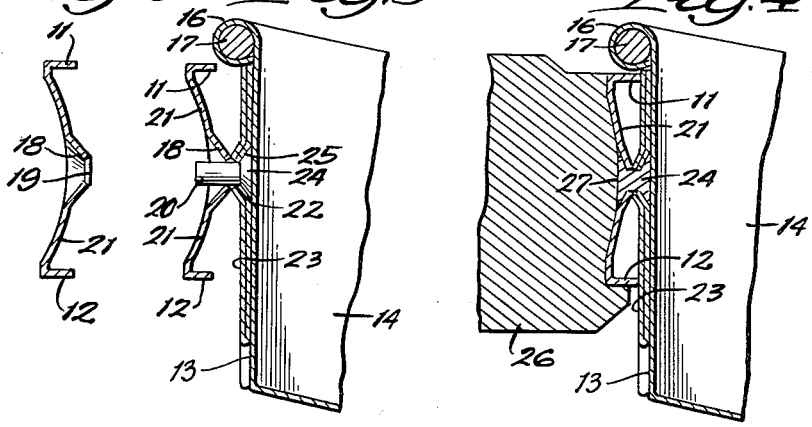
INVENTOR:
Robert I. Fredrickson,
BY
Dawson & Ooms,
ATTORNEYS.

United States Patent Office 2,704,470
Patented Mar. 22, 1955

2,704,470
METHOD FOR FLUSH RIVETING

Robert I. Fredrickson, Chicago, Ill., assignor to Chicago Metallic Manufacturing Company, Chicago, Ill., a corporation of Illinois Application April 11, 1951, Serial No. 220,487

5 Claims. (Cl. 78—46)

This invention relates to means for joining metallic members by riveting and it is an object of this invention to provide a new and improved technique for riveting.

It is a related object to provide a method for riveting which does not entail substantial weakening of the metallic parts in preparation of the parts for joining with others by riveting, which provides for a tight sealing or gripping relation between the rivet and the surrounding metallic member thereby to improve the permanence and strength of the riveted units, which effects a sealing relation between the riveted parts thereby to minimize leakage or possible contamination, and in which the upset head of the rivet lies substantially flush with the adjacent metallic surfaces so as to enhance the appearance and to minimize the presence of obstructions as well as to increase the sanitary conditions existing when the riveted article is used in the processing of food or the like.

Another object is to produce a riveted assembly in the form of an improved baking pan and to provide a method for producing the same.

These and other objects and advantages of this invention will hereinafter appear, and for purposes of illustration, but not of limitation, an embodiment of this invention is shown in the accompanying drawing, in which Figure 1 is a perspective view of a baking pan assembly fabricated in accordance with this invention;

Figure 2 is a sectional elevational view of a sheet metal band prepared for riveting to the upright wall of a baking pan or other metal object in accordance with this invention;

Figure 3 is a sectional elevational view showing the arrangement of parts before the rivet is upset to effect a joining relation between metal parts, and Figure 4 is a sectional elevational view showing the relation of the parts in Figure 3 after the rivet has been upset in accordance with the practice of this invention.

In the past, metallic members adapted to be riveted to other metallic units have been prepared for riveting by forming openings therein, as by drilling or punching, with the openings being sufficiently large to permit ready insertion of the rivet. Such openings in the body of the metallic member has provided zones of weakness and markedly reduce the section effective for carrying the load on the metallic part. After the rivet has been upset in the normal manner, the body of the rivet extending through the opening very often fails to enlarge sufficiently to fill the opening and effect an integrated relation with the metallic member so as to overcome, to some extent, the zone of weakness introduced in the metallic member. Such failure of integration also results in lack of a sealing relation so that a spaced relation remains between the rivet and the adjacent metal member which permits passage of gases and fluids and permits foreign material to be lodged therein which might subsequently contaminate ingredients processed in the riveted metallic member or provide unsanitary conditions in the event that the riveted metallic member is used for the processing or dispensing of foods. In some instances the body portion of the rivet becomes enlarged when the rivet is upset with the result that less of the metal is formed into the rivet head for establishing the desired anchoring relation. Most objectionable is the projection of the upset head outwardly from the assembly where it presents an obstruction and mars the appearance of the riveted structure.

In accordance with this invention, the objectionable features existing in prior processes are overcome by a method of riveting which causes a firm gripping relation to be established all around between the rivet and the adjacent metal member as an incidence to assembly and to effect a sealing relation all around which broadens the use as well as improves the use of the riveted article. By way of setting forth further advantages, the rivet head contains substantially all of the metal available and is formed to be substantially flush with the adjacent portions of the metal surface although it may be spaced slightly therefrom thereby to avoid projections which might prove harmful or unsightly.

Although the invention with respect to the method of riveting will now be described in connection with the manufacture of a particular type of new and improved baking pan, it will be understood that the inventive concepts are also capable of being practiced for the joinder of metallic parts generally. The baking pan assembly comprises a plurality of substantially rectangular baking tins 15 having upright end and side walls 13 and 14 adapted to be strapped together by a band 10 riveted to the upright walls of the baking pans in accordance with the practice of this invention.

As shown in the drawing, an elongate metallic band 10 having inturned flanges 11 and 12 formed on the edge portions thereof is adapted to be riveted to the side and end walls 13 and 14 respectively of a number of baking pans 15 to effect an assembled relation and incidentally to function as a reinforcement and guide for the pans. The pans themselves are formed of metallic sheet stock having a rim 16 rolled about a reinforcing rod 17 beneath which the upper flange 11 of the band 10 is adapted to rest when in the assembled relation. It is preferred to join the band 10 to the upright walls of the pans 15 by means which cause the flanges resiliently to bear against the respective upright walls of the pan. The walls are outwardly inclined to a slight degree to facilitate removal of the baked article and to permit stacking of the pan assemblies. The lower edge of the band functions as a stop when in stacked relation. In the example shown the band is formed with a separate section 10ª along the side walls of the end pans. The remaining portions 10 of the band instead of being riveted to the upright walls of the pan, are riveted to a rivet plate 23 folded double and lying adjacent the upright walls of the pan so that it may be possible for further support for the inner portion to extend upwardly and fold about the reinforcing wire 17 beneath the rim 16.

In accordance with this invention, the metallic band 10, or any other metallic part to be secured to another by riveting, is countersunk, as indicated by the numeral 18, in the area to be riveted by amount greater or deeper than that necessary to contain the head of the rivet when upset. An opening 19 is formed in the base of the countersink dimensioned to be slightly greater than the rivet 20 so as to permit passage of the portion of the rivet to be upset therethrough. The opening 19 may be formed at the same time as the countersink by a punching process or it may be formed before or after the countersink as by drilling or the like. The entire body portion 21 of the band may be inclined slightly to increase the taper of the countersink or the countersink may be inclined at a greater angle than is to be assumed in the final assembly for purposes which will hereinafter become evident.

A corresponding opening 22 is also provided in the metallic member 23 to which the band is to be attached. It is preferred to form a countersink therein which is adapted to receive the head 24 of the rivet in a manner to bring the head flush with the adjacent surfaces of the metallic member. The rivet 20 may then be inserted through the registered openings 19 and 22 with the head 24 seating within the countersink 25 and with the end portion to be upset extending through the countersink 18 formed in the band. The anvil or other supporting member is brought against the underside of the rivet and the upsetting punch 26 is brought down to upset the end of the rivet while at the same time flattening out the countersink which causes the opening 19 to decrease in dimension and tightly grip the rivet portion disposed therein. This effects an integrated sealing relation between the rivet and the metal band which substantially overcomes weaknesses introduced by forming the opening. This forced engagement between the rivet and the band also prfevents flow of metal from the end portion upset thereby to make available more of the rivet for the development of the head 27. The curvature of the punch should correspond to the contour desired in the band so as to flatten the countersink by an amount to bring the upper edge of the head on the same level as the adjacent curvilinear surfaces of the band. If a hard rivet is used it is preferred to effect the upsetting action by direct impacting force. If a soft rivet is used, it is possible for the punch to be urged into position in advance of application of force for upsetting. In the latter event, the edge of the countersink adjacent the opening bites into the rivet in advance to establish a gripping relation.

If, as in the band described, incline also is formed through the cross section of the body portion and the upsetting punch forms the body portion inwardly to bring the ends of the flanges into resilient engagement with the vertically disposed walls of the pan, further tension is provided to insure the desired sealing and gripping relation while a more desirable assembly is effected with respect to the attachment of the band with the pan.

In the described application of this invention, the bread pans secured together by the riveted strap or band provides for an improved tight fit between the bread pan and the upper and lower edge portions of the band. The rivet head, though it may not fill the countersink, does not project beyond the wall of the riveted assembly and substantially conforms to the contour of the band. This not only improves the appearance of the assembly but eliminates means by which injury might occur.

It will be understood that the method of riveting described and claimed is applicable to other metal parts having characteristics which permit countersinking, and/or transdeformation, such as sheet metal stock or the like, responsive to applied force and that numerous changes may be made in the details of construction, arrangement and operation without departing from the spirit of the invention, especially as defined in the following claims.

I claim:

1. In the method of joining metallic members by riveting, the steps of countersinking the metallic member in the area to be riveted by an amount greater than that necessary to contain the upset head of the rivet and providing an opening in the base through which the end of the rivet to be upset is able to pass, inserting the rivet through aligned openings in the metallic member, and upsetting the end of the rivet while flattening the countersink to decrease the size of the opening.

2. In a method for riveting metal members, the steps of countersinking a metal member by an amount greater than that necessary to contain the upset head of the rivet and providing an opening in the end of the countersunk portion through which the rivet is able to pass, aligning the opening in the metal member with a corresponding opening in the member to which it is to be riveted and inserting the rivet through said openings with the end portion to be upset extending through the countersink, and upsetting the rivet while flattening the countersink to decrease the opening thereby to effect a gripping relation between the metal member and the rivet extending through the opening.

3. In a method for riveting one metal member to another having a countersunk portion greater than that necessary to contain the upset head of the rivet and an opening in the base thereof dimensioned to be slightly greater than that of the rivet, the step of flattening the countersink while upsetting the rivet portion extending through aligned openings in the metal members and into the countersink to reduce the size of the opening and bring the adjacent edges of the metal member into gripping relation with the rivet.

4. In the method of fabricating a baking pan assembly having a plurality of pans strapped together by a reinforcing band, the steps of providing openings in the upright walls of the pan dimensioned to be slightly greater than the cross section of a securing rivet, countersinking the band by an amount greater than that necessary to contain the upset head of the rivet and providing an opening in the end of the countersunk portion for registry with the opening in the pan and dimensioned to enable the rivet to be inserted therethrough, inserting the rivet through aligned openings in the pan and band, flattening the countersink while upsetting the rivet to bring the head flush with the surface of the band while decreasing the opening to establish a gripping relation between the band and the portion of the rivet extending therethrough.

5. In the method of fabricating a baking pan assembly as claimed in claim 4 in which the band has inwardly extending edge flanges and is bowed outwardly in transverse cross-section toward the edges, the additional step of straightening the band with the upsetting punch to bring the end flanges into resilient engagement with the upright walls of the pan further to decrease the size of the opening.

References Cited in the file of this patent

UNITED STATES PATENTS

| | | |
|---|---|---|
| 1,249,948 | Gruber | Dec. 11, 1917 |
| 1,302,661 | Jackson | May 6, 1919 |
| 2,114,289 | Draim | Apr. 19, 1938 |
| 2,116,975 | Kollman | May 10, 1938 |
| 2,177,191 | Sandberg | Oct. 24, 1939 |
| 2,314,574 | Dickerman | Mar. 23, 1943 |
| 2,347,694 | Langel | May 2, 1944 |
| 2,532,109 | Langel | Nov. 28, 1950 |
| 2,564,372 | Phelps et al. | Aug. 14, 1951 |

FOREIGN PATENTS

| | | |
|---|---|---|
| 664,199 | France | Apr. 22, 1929 |